(12) United States Patent
Siegeritz

(10) Patent No.: US 7,233,412 B2
(45) Date of Patent: Jun. 19, 2007

(54) METHOD OF DETERMINING A COLOR PROFILE FOR PRINTING WITH N PRINTING INKS

(75) Inventor: Helmut Siegeritz, Kronshagen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 966 days.

(21) Appl. No.: 10/075,538

(22) Filed: Feb. 14, 2002

(65) Prior Publication Data

US 2002/0122208 A1 Sep. 5, 2002

(30) Foreign Application Priority Data

Mar. 2, 2001 (DE) ................. 101 10 125

(51) Int. Cl.
*H04N 1/46* (2006.01)
*G06K 15/00* (2006.01)

(52) U.S. Cl. .................. 358/1.9; 358/518; 358/520; 358/504; 382/166; 382/167

(58) Field of Classification Search ............. 382/162, 382/163, 167, 166; 358/1.9, 2.1, 500, 504, 358/509, 515, 517, 518, 520, 529

See application file for complete search history.

(56) References Cited

U.S. PATENT DOCUMENTS

| | | | |
|---|---|---|---|
| 4,561,016 A | 12/1985 | Jung et al. | |
| 4,878,977 A | 11/1989 | Kueppers | |
| 5,255,350 A | 10/1993 | Hermann et al. | |
| 5,307,182 A * | 4/1994 | Maltz | 358/518 |
| 5,398,121 A | 3/1995 | Kowalewski et al. | |
| 5,457,541 A * | 10/1995 | Burns | 358/3.21 |
| 5,530,656 A * | 6/1996 | Six | 702/108 |
| 5,553,199 A | 9/1996 | Spaulding et al. | |
| 5,563,724 A | 10/1996 | Boll et al. | |
| 5,687,300 A | 11/1997 | Cooper | |
| 5,696,839 A | 12/1997 | Siegeritz | |
| 5,835,244 A | 11/1998 | Bestmann | |
| 5,844,699 A * | 12/1998 | Usami et al. | 358/518 |
| 5,877,787 A | 3/1999 | Edge | |
| 5,909,220 A * | 6/1999 | Sandow | 345/589 |
| 5,911,003 A * | 6/1999 | Sones | 382/162 |

(Continued)

FOREIGN PATENT DOCUMENTS

DE 44 09 226 C2 10/1994

(Continued)

*Primary Examiner*—Jerome Grant, II
(74) *Attorney, Agent, or Firm*—Laurence A. Greenberg; Werner H. Stemer; Ralph E. Locher

(57) ABSTRACT

A method of determining a printing color profile for printing with N printing inks, which form a color solid of the printable inks in a device-independent color system, includes the steps of selecting one or more printing inks, and defining an inner reference curve in the device-independent color system. The inner reference curve is preferably selected such that it lies in the vicinity of the neutral colors. Using first test forms, which are printed and measured calorimetrically, boundary surfaces between the inner reference curve and the outer envelope of the color solid are defined, which subdivide the color solid into color sectors. With second test forms for the color sectors, a projection of the color sectors in the device-independent color system is determined and, from this, the printing color profile is determined.

21 Claims, 8 Drawing Sheets

U.S. PATENT DOCUMENTS

| | | | |
|---|---|---|---|
| 5,943,143 A | 8/1999 | Kawai et al. | |
| 5,978,011 A | 11/1999 | Jacob et al. | |
| 6,014,457 A | 1/2000 | Kubo et al. | |
| 6,062,137 A * | 5/2000 | Guo et al. | 101/171 |
| 6,262,808 B1 | 7/2001 | Hermann | |
| 6,281,984 B1 | 8/2001 | Decker et al. | |
| 6,480,299 B1 * | 11/2002 | Drakopoulos et al. | 358/1.9 |
| 6,769,759 B2 * | 8/2004 | Yamasaki et al. | 347/41 |
| 6,995,865 B1 * | 2/2006 | Motomura | 358/1.9 |
| 2002/0122208 A1 * | 9/2002 | Siegeritz | 358/2.1 |
| 2003/0098986 A1 * | 5/2003 | Pop | 358/1.9 |
| 2005/0147424 A1 * | 7/2005 | Kato et al. | 399/49 |
| 2005/0150411 A1 * | 7/2005 | Bestmann | 101/484 |

FOREIGN PATENT DOCUMENTS

| | | |
|---|---|---|
| DE | 43 35 143 A1 | 4/1995 |
| DE | 44 17 449 C2 | 11/1995 |
| DE | 198 35 951 A1 | 4/1999 |
| DE | 198 56 574 A1 | 9/1999 |
| EP | 0 096 090 B1 | 12/1983 |
| EP | 0 131 145 B1 | 1/1985 |
| EP | 0 446 168 B1 | 9/1991 |
| EP | 0 563 498 A1 | 10/1993 |
| EP | 0 586 139 A2 | 3/1994 |
| EP | 0 681 396 B1 | 11/1995 |
| EP | 0 682 440 A2 | 11/1995 |
| EP | 0 735 743 A2 | 10/1996 |
| EP | 0 884 894 A2 | 12/1998 |
| JP | 10282756 * | 10/1998 |
| JP | 2005-27094 * | 1/2005 |

* cited by examiner

METHOD OF DETERMINING A COLOR PROFILE FOR PRINTING WITH N PRINTING INKS

BACKGROUND OF THE INVENTION

Field of the Invention

The invention relates to the field of electronic reproduction technology and pertains to a method of determining a color profile for printing with more than three colored printing inks, in general terms, for printing with N printing inks.

In reproduction technology, printing originals for printed pages are produced that contain all the elements to be printed such as texts, graphics, and images. For colored printing, a separate printing original is produced for each printing ink, containing all the elements that are printed in the respective color. For standard four-color printing, these are the printing inks cyan, magenta, yellow, and black (CMYK). The printing originals, separated by printing inks, are also referred to as color separations. The printing originals are generally screened and exposed onto films, which are then processed further to produce printing forms for printing high numbers (printing plates, printing cylinders). Alternatively, the printing originals can be exposed directly on printing plates in special recorders. There are also digital printing machines, which process the printing original data directly, without the intermediate step of the production of color separation films or printing plates, and convert the data into printed products.

The printing originals of a printed page to be reproduced describe the page in the form of printing data that, in the case of four-color printing, specify the percentages of the printing inks CMYK to be printed in each image point by four printing color values. For example, each printing color value is described by one byte, that is to say, it can be varied in 256 steps between 0% and 100%. The printing color value 0% means that the printing ink is not printed at the corresponding point on the printed page, and the printing color value 100% means that the printing ink is printed with its solid-tone value, that is to say, the maximum possible proportion.

To determine the printing color values, for example, for an image to be printed, the image is scanned with light in a scanner, line by line and image point by image point, initially scanner color values for the primary colors red, green, and blue (RGB) being produced for each image point. The scanner color values can be converted directly into the printing color values CMYK in a color computer. Nowadays, however, the scanner color values are frequently first converted, in an intermediate step, into device-independent color values, for example, into the color values of the Lab color system. The Lab color system has been standardized by the Commission Internationale d'Éclairage (CIE), and it describes the colors as a human standard observer sees them. The intermediate step is made to decouple the colors from the device-dependent color systems of scanners, color monitors, color printers, printing machines, and so on, and to describe and to process the colors to be printed in a device-independent color system. In a second step, the Lab color values, which are, as a rule, further color-corrected and retouched, are converted into the printing color values CMYK.

FIG. 1 shows the color conversions from the scanner color values RGB, through the uncorrected color values L1, a1, b1 and the corrected color values L2, a2, b2, into the printing color values CMYK in accordance with the current operating sequence. The relationship between the respective device color values and the Lab color values that correspond to them is preferably represented by a color profile. The scanner color profile accordingly describes what Lab color is associated with every possible combination of the RGB color values from the scanner, and the printing color profile ndicates, for each Lab color, the associated CMYK color values that have to be printed to obtain the Lab color in the printed product. The color profiles are generally multidimensional conversion tables that, at least for a subset of the possible Lab color values, contain the associated device-dependent color values. For color values lying between these, an interpolation is then carried out. The International Color Consortium (ICC) has standardized the data format of the color profiles. Decoupling through the Lab color system also makes it possible to combine any desired devices, such as various scanners or other image sources or various printing processes, in one operating sequence and to change it flexibly, without, as a result of the many different device-dependent color systems, the overview being lost of which color will come out at the end of the process. Monitoring the color through various devices in a complex operating sequence is designated color management.

In the case of traditional four-color printing using the standard colors CMYK, the gamut of the printable colors that are available is reduced considerably in some areas as compared with the perceivable colors in slides or the colors on a monitor. Although these restrictions can be reduced if, instead of the standard colored printing inks cyan, magenta, and yellow, special inks for cyan, magenta, and yellow are used, which are still more colored. However, a comprehensive solution necessitates printing with more than three colored printing inks.

In the simplest case, it is possible, for example, to add a further colored printing ink such as red or green to the standard colors CMYK to widen the gamut of the printable colors in a specific area. Such a case occurs in package printing, when special, saturated product or logo colors have to be reproduced. Even if such a special color can be produced with the standard printing inks, an appropriate special color provides increased stability with respect to the fluctuations in the printing process of two overprinted standard printing inks. If, in a number of hue areas, the color gamut of the printed colors is to be widened, it is possible to print, for example, with seven colors, with the standard colors CMYK and three further colored printing inks red, green, and blue.

German Patent DE-4417449-C2 describes a simple process for producing the color separation for an additional printing ink, the secondary color of the additional color in the standard printing inks being left out, by an appropriate amount being subtracted from the standard printing inks involved.

European Patent EP-0131145-B1 describes a method that operates with seven or eight printing inks and in which the surface elements printed are printed beside one another. In such a case, up to four printing inks are printed at each image point, surface elements in the printing colors white and black, on one hand, and surface elements of two colored printing inks adjacent in hue, on the other hand. The printing color values are obtained from the scanned RGB color values by step-by-step subtraction of components that are common to a plurality of RGB color values.

In European Patent Application EP-0735743-A2, corresponding to U.S. Pat. No. 5,687,300 to Cooper, a method is described that calculates the color separations for seven printing inks from the scanned RGB color values by simple operations such as addition, subtraction, minimum, and maximum function, the computed values being corrected with simple one-dimensional tabular functions relating to the printing process characteristics.

In European Patent Application EP-0586139-A2, a method of determining the color separations for seven printing inks is described, in which two three-dimensional conversion tables are calculated, one table that converts the scanned RGB color values into the four standard printing colors CMYK, and a further table that converts the scanned RGB color values into the additional printing colors red, green, and blue.

All the prior art methods are restricted to the color separation in seven printing inks, the six colored printing inks substantially being the standard printing inks cyan, magenta, and yellow, on one hand, and their complementary colors red, green, and blue, on the other hand, that is to say, the hue angles of the colored printing inks are distributed uniformly over the color circle. The prior art methods also, to some extent, do not have a sufficiently accurate color reproduction, particularly not the methods in which the color reproduction characteristic of the printing process and of the printing machine to be used are not included in the calculations.

SUMMARY OF THE INVENTION

It is accordingly an object of the invention to provide a method of determining a color profile for printing with N printing inks that overcomes the hereinafore-mentioned disadvantages of the heretofore-known devices and methods of this general type and that determines a printing color profile with a high reproduction quality for a system of N printing inks. In such a case, the selection of the colored printing inks with respect to their hue angle and their number is any desired, within wide limits. The method can be used both for printing ink systems that contain the printing ink black, and for printing ink systems with only colored printing inks.

With the foregoing and other objects in view, there is provided, in accordance with the invention, a method of determining a printing color profile for printing with N printing inks forming a color solid of printable colors in a device-independent color system, including the steps of defining an inner reference curve in the device-independent color system by selecting one of the group consisting of a printing ink and a combination of printing inks, defining boundary surfaces between the inner reference curve and an outer envelope of the color solid subdividing the color solid into color sectors by producing first test forms, the first test forms being calorimetrically printed and measured, producing second test forms for the color sectors, the second test forms being calorimetrically printed and measured, and determining the printing color profile from measured values from the second test forms.

In accordance with another mode of the invention, the inner reference curve is defined by the printing ink black.

In accordance with a further mode of the invention, the inner reference curve is defined by a combination of printing inks.

In accordance with an added mode of the invention, the inner reference curve lies in a region of neutral colors.

In accordance with an additional mode of the invention, the first test forms contain color fields in which proportions of the printing inks selected for the inner reference curve and of one colored printing ink are varied.

In accordance with yet another mode of the invention, the first test forms contain color fields in which proportions of the printing inks selected for the inner reference curve and of two colored printing inks are varied and a hue of the two colored printing inks are approximately equal. Preferably, a hue of the two colored printing inks are substantially equal.

In accordance with yet a further mode of the invention, the second test forms contain color fields in which proportions of the printing inks selected for the inner reference curve and of two colored printing inks are varied.

In accordance with yet an added mode of the invention, the second test forms contain color fields in which proportions of the printing inks selected for the inner reference curve and of three colored printing inks are varied and two of the three colored printing inks have an approximately identical hue. Preferably, two of the three colored printing inks have a substantially identical hue.

In accordance with yet an additional mode of the invention, the printing color profile is described in the form of a table, in which predefined device-independent color values are assigned the printing color values of the printing inks with which predefined colors can be printed.

In accordance with again another mode of the invention, the printing color profile is a table having predefined device-independent color values assigned to printing color values of the printing inks with which predefined colors can be printed.

With the objects of the invention in view, there is also provided a method of determining a printing color profile for printing with N printing inks forming a color solid of printable colors in a Lab color system, including the steps of defining an inner reference curve in the Lab color system by selecting one of the group consisting of a printing ink and a combination of printing inks, defining boundary surfaces between the inner reference curve and an outer envelope of the color solid subdividing the color solid into color sectors by producing first test forms, the first test forms being calorimetrically printed and measured, producing second test forms for the color sectors, the second test forms being calorimetrically printed and measured, and determining the printing color profile from measured values from the second test forms.

Other features that are considered as characteristic for the invention are set forth in the appended claims.

Although the invention is illustrated and described herein as embodied in a method of determining a color profile for printing with N printing inks, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
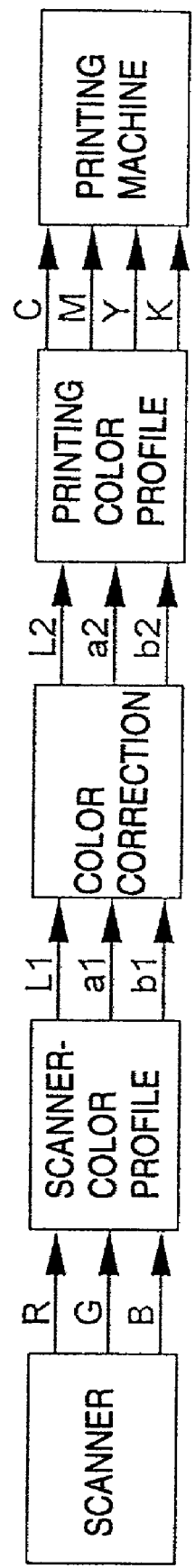
FIG. 1 is a block diagram illustrating a prior art operating sequence when producing printing data from scanned image data with the aid of color profiles.

The method according to the invention permits the calculation of specific printing color profiles for the conversion of device-independent colors (Lab) into the printing color values of a printing ink system with N printing inks, which, in accordance with the International Color Consortium (ICC) specification, are designated link profiles. The calculation of the inverse conversion from the printing color values to the device-independent Lab color values is easily possible with the aid of conventional simple methods, by which means the printing color profiles can be supplemented to form the more comprehensive device profiles. Just like conventional printing color profiles, the color profiles determined in accordance with the invention can be combined with a method for color gamut adaptation (gamut mapping), in order to take into account the fact that specific colors, for example, those contained in a slide, cannot be printed even with an expanded printing ink system including N printing inks. Such a method is described, for example, in German Patent DE 44 09 226, corresponding to U.S. Pat. No. 5,696,839 to SIEGERITZ.

For a typical human observer of a printed product, the perception of color is characterized by a three-dimensional color space. Therefore, standardized device-independent color systems such as the XYZ or the Lab color system are likewise three-dimensional. If more than three printing inks are used, the proportions of the printing inks that are needed to produce a specific color are not defined uniquely. In general, there is a plurality of combinations of printing color values that produce the same color. To define the association between device-independent, predefined Lab colors and the corresponding printing color values in a unique way in spite of this, additional, restrictive boundary conditions have to be observed, which emerge from the special technical features of the printing process.

One of these conditions is that the total application of color of overprinted printing inks (area coverage sum) has to be limited, for example to 340% in offset printing. The reasons for such limitation are, inter alia, the necessary drying times and the limited ink absorption of the paper surface. Although a total color application of up to 700% would, therefore, be theoretically possible in seven-color printing, the ranges of the seven-dimensional printing color space, where the sum of the color components lies above the predefined limit, cannot be used. However, colors with a very high overall application of color cannot be printed stably either, that is to say, with good repetition accuracy.

If the printing ink black is used, and the black does not have a color cast, it is possible to print all neutral (gray) areas of images entirely without colored printing inks. When fine screens are used, such printing leads to good results, but, in the case of coarser screens, the raster structure is clearly visible in these areas. In addition, the optical density that can be achieved with black on its own is often inadequate on the other hand, by using black, the quantity of colored printing inks used can be reduced, and the printing process can be stabilized. It is, therefore, necessary to be able to select different ink build-up variants, so that the inner range of the neutral colors is built up with more or less black, depending on the boundary conditions.

When conventional screens are used, only a limited number of screen angles are available if the formation of Moiré fringes is to be avoided, normally four different angles. It is, therefore, often necessary for a plurality of printing inks to use the same screen angle. Because the overprinting of a plurality of colors at the same screen angle leads to poorly reproducible printed results in many cases, such a case must, at most, occur in the case of small screen dots.

The aforementioned requirements are taken into account by the method according to the invention by defining corresponding, additionally restrictive conditions for the color separation. A significant feature of the method is a special breakdown of the entire color solid of the printable colors into partial bodies, which, in each case, can be treated separately. The partial bodies in each case correspond to specific sub-spaces of the entire N-dimensional printing color space. The basis for such a breakdown is the determination of process characteristics in selected areas of the printing process. The determination is initially carried out using a first set of test forms and then, with a second set of test forms, which are printed by the printing process to be determined and are then measured calorimetrically. The methods of the breakdown and the construction of test forms resulting therefrom will be described first for printing processes with the printing ink black.

If the printing ink black is printed with different percentages between 0% and 100%, the result, from the corresponding color measured values, is a curve in the Lab color system that runs from paper white as far as pure black.

Figure 2:
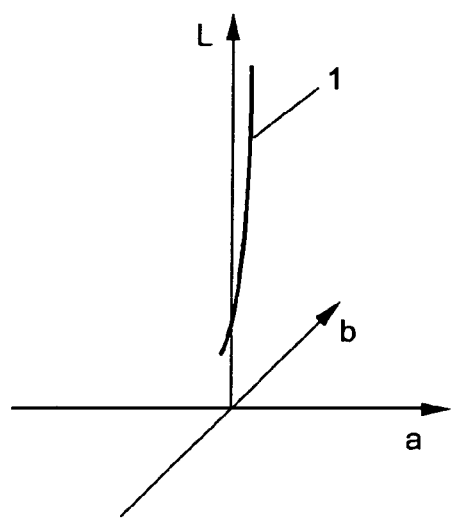
FIG. 2 is a three-dimensional graph showing an inner reference curve in a Lab color system according to the invention.

Referring now to the figures of the drawings in detail and first, particularly to FIG. 2 thereof, there is shown the curve, which will be referred to below as the inner reference curve 1. The curve 1 is shown by way of example in FIG. 2. In the case of most printing processes, the inner reference curve 1 lies in the interior of the overall process color solid, in general, however, it does not lie on the gray axis, that is to say, on the L axis of the Lab color system. A particularly simple breakdown of the color solid is achieved if it is prescribed that no colored printing colors are to be used on all points on the inner reference curve 1. Such a case will be explained first. The more general case, more advantageous for many practical printing processes, in which neutral colors are formed by overprinting black and some colored printing inks, will be derived later from the special case.

Figure 3:
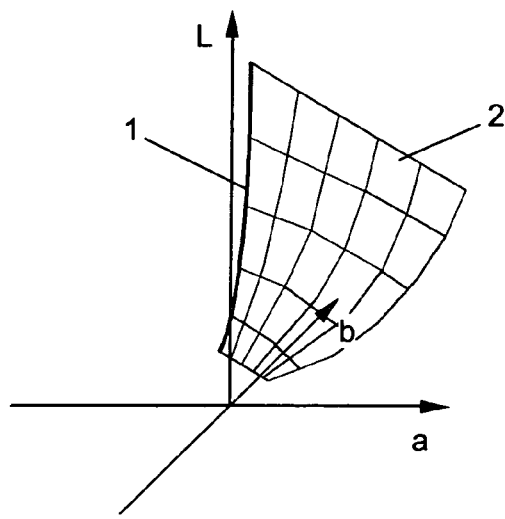
FIG. 3 is a three-dimensional graph showing a boundary surface in the Lab color system according to the invention.

The various combinations of black and an individual colored printing ink form a two-dimensional set of points that, in the Lab color system, is depicted as a boundary surface in the process color solid in the form of a very distorted square. The corresponding boundary surface 2 is shown by way of example in FIG. 3 for the printing ink magenta. The surface 2 is bounded on one side by the inner reference curve 1. To register the position and shape of the boundary surface 2 in the Lab color system in numeric terms, a test form with combinations of some discrete values of the printing inks black and magenta is printed and then measured calorimetrically.

Figure 4:
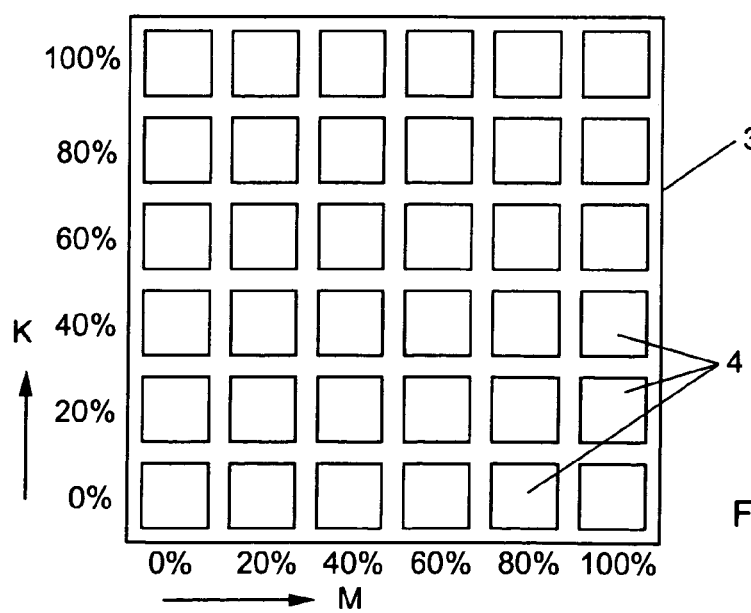
FIG. 4 is a diagram of a test form for determining a boundary surface according to the invention.

Such a test form 3 is shown in FIG. 4. The test form 3 includes color fields 4, whose printing color values for black and magenta are varied systematically. In the example of FIG. 4, in the color fields 4, the proportions of magenta increase from left to right, and the proportions of black increase from bottom to top. With the color measured values from the fields 4 of the test form 3, the points in the Lab color system corresponding to the printing ink combinations are obtained.

By two-dimensional interpolation between the printing color values of the color fields 4 or between the points measured for such a purpose in the Lab color system, it is then possible with sufficient accuracy to describe the two-dimensional sub-process including black and the colored printing ink. For practical purposes, a step width of 10% between 0 and 100% has proven to be sufficiently accurate. A graduation with 0, 10, 20, 40, 70 and 100% is also suitable for such a purpose.

For all the colored printing inks envisaged, corresponding two-colored test forms 3 with color fields 4, in which the respective colored printing ink is combined with the printing ink black, are produced in accordance with the scheme described. In addition, in a further test form, color fields are combined that contain all the possible color combinations of two colored full-tone inks in each case. In the case of N−1 colored printing inks, the result is (N−1)×(N−2)/2 fields for such a further test form.

The entire set of N test forms is then printed, preferably simultaneously, on a printed sheet, and all the test fields are measured calorimetrically. The first N−1 test forms yield the descriptions for the two-dimensional sub-processes between a colored printing ink and black in each case. In the Lab color system, this results in a set of boundary surfaces 2, which all have the inner reference curve 1 in common. For the purpose of illustration, three boundary surfaces 2 for the colored printing inks cyan, magenta, and yellow are sketched in FIG. 5. In the example, the printing process color solid is divided by the three boundary surfaces 2 into three color sectors 5. Colors that are produced from a colored printing ink and black lie on the boundary surfaces 2. In the color sectors 5 between the surfaces there are colors that are produced from black and two colored printing inks. A color sector 5 between two boundary surfaces 2 in the Lab color system corresponds to a three-dimensional sub-space in the higher-dimensioned printing process color space. The proportions of color of the three printing inks involved in each case vary between 0 and 100%.

Figure 5:
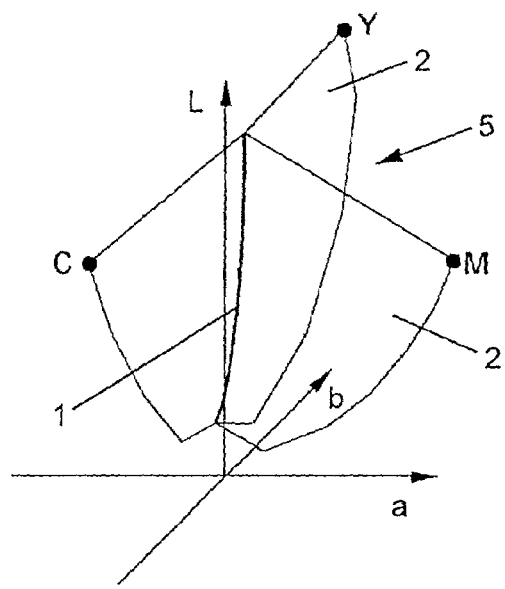
FIG. 5 is a three-dimensional graph showing the boundary surfaces for a printing ink system with four standard printing inks in the Lab color system according to the invention.
Figure 6:
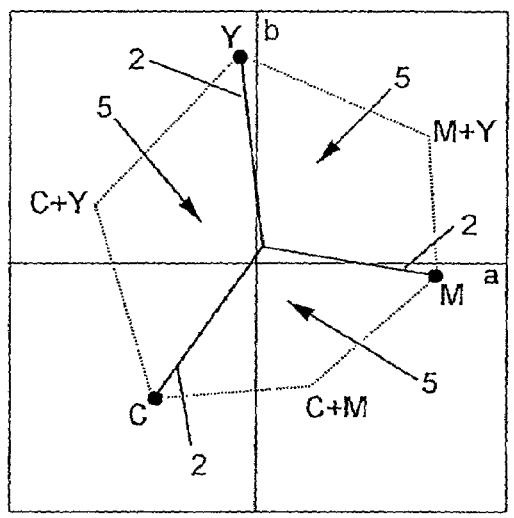
FIG. 6 is a plan view in the a,b plane of the graph of FIG. 5 showing the boundary surfaces and color sectors for a printing ink system with four standard printing inks in the Lab color system.

In FIG. 6, the example of FIG. 5 is shown again in a view from above of the a,b plane. The maximum extent of the printing process color solid in the a,b plane is determined by the solid-tone colors CMY and the solid-tone mixed colors C+Y, M+Y, and C+M. The Lab color values of the full-tone mixed colors are obtained from the measured values from the test form, whose fields contain the combination of in each case two colored full-tone colors.

Figure 7:
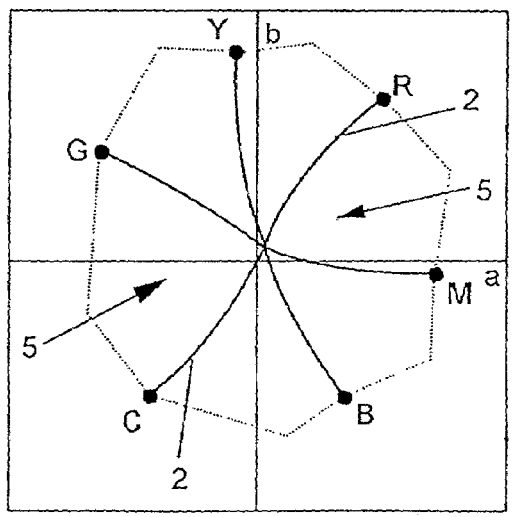
FIG. 7 is a plan view in the a,b plane of the graph of FIG. 5 showing an alternative embodiment with the boundary surfaces and color sectors for a printing ink system with seven printing inks in the Lab color system.

FIG. 7 shows schematically, as a further example, a seven-color system having the 6 colored printing inks cyan, magenta, yellow, red, green, blue, in the view from above of the a,b plane. The 12-cornered outline is produced by the six colored full-tone colors and the six full-tone mixed colors between adjacent printing inks in each case. In the example, six (6) color sectors 5 result between the boundary surfaces 2. In FIG. 7, it is indicated that the boundary surfaces 2 between the color sectors 5 of the color solid are generally irregularly shaped and, in the projection onto the a,b plane, usually result in curves or even narrow areas.

Figure 8:
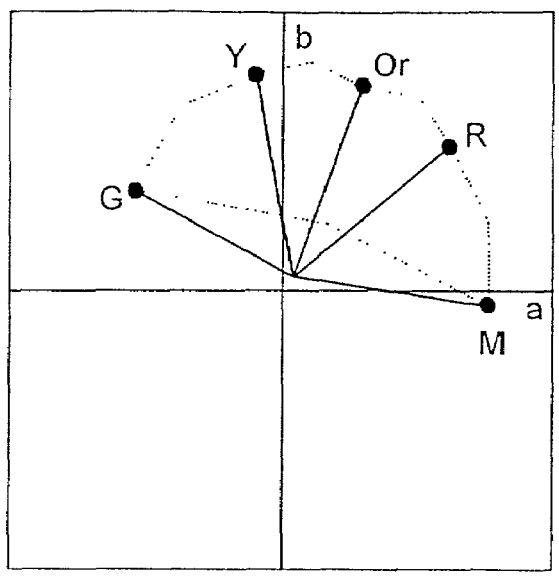
FIG. 8 is a plan view in the a,b plane of the graph of FIG. 5 showing an alternative embodiment with the boundary surfaces and color sectors for a printing ink system with five special colors in the Lab color system.

The production, printing and measuring of the first set of test forms is used for the purpose of obtaining an overview of the extent and form of the printing process color solid in the Lab color system. In addition, the form and position of the boundary surfaces 2 between the color sectors 5 is determined thereby. After the measured color values from the first set of test forms are available, the user can assess the printing process color solid from various points of view, for example, by using graphic representations that, corresponding to FIG. 5, 6, or 7, are generated on a computer screen by suitable software. Whether or not the corresponding spatial relationships in the Lab color system are acceptable depends to a great extent on the intentions of the user. For example, a printing process with a color solid like that which is illustrated in FIG. 8, which includes the printing inks green, yellow, orange, red, and magenta and contains only a sub-area of the perceptible colors, may be entirely suitable for package printing with images and product colors, in which only specific color ranges occur. For the usual production technology with arbitrary images, on the other hand, such a color solid would be completely unsuitable.

Further checks are preferably carried out by computation with suitable software. For example, a check is made as to whether or not the colored printing inks have a minimum spacing from one another in the Lab color system, and whether or not all lie on the outer envelope of the color solid. This is required because the intention is to avoid a colored printing ink having the same color values as a combination of the other printing inks located far in the interior of the color solid. For such a purpose, a convex envelope in the Lab color system is calculated from the measured values of the first N−1 test forms of the first set of test forms. Suitable methods for such a purpose are described in the literature relating to computer graphics.

The colored printing inks are ordered in a circumferential sequence in the a,b plane with the aid of the previously calculated convex envelope. The sequence is used to decide which printing ink is respectively adjacent to which other. This means that, overall, a breakdown of the printing process color solid into individual color sectors 5 has also been achieved, and at the same time the printing inks to be used in each color sector 5 have been defined. Each color sector 5 of the printing process color solid, in the simplest case considered hitherto, where only the printing ink black is used for neutral colors, can be produced from three printing inks, namely from black and the colored printing inks of the two boundary surfaces 2, which bound the color sector 5 on each side. Each color sector 5 respectively corresponds to a three-dimensional sub-space of the overall N-dimensional printing process color space. By varying the proportions of the three printing inks between 0 and 100%, all points in a color sector are reached.

Figure 9:
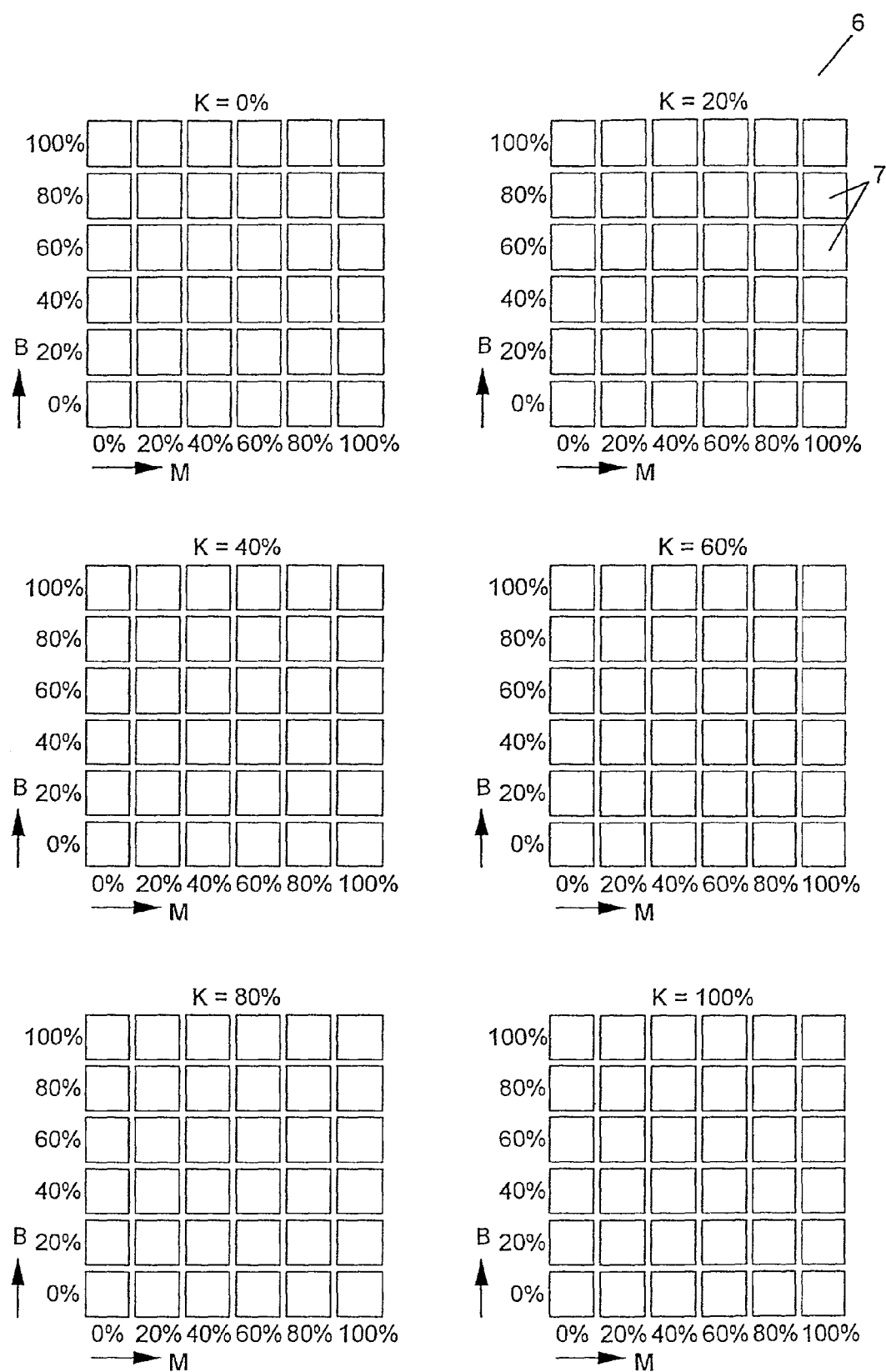
FIG. 9 is a diagrammatic representation of a test form for determining a color sector according to the invention.

In the next step of the method according to the invention, a second set of test forms is produced, one test form being formed for each color sector 5, its color fields containing combinations of the three printing inks involved in the color sector. FIG. 9 shows, as an example, a test form 6 for a color sector 5 having the three printing inks black, magenta, and blue. The test form 6 contains a number of groups of color fields 7. In each group, the printing inks magenta and blue are varied in steps, and the printing ink black has a constant printing color value. From group to group, the printing ink black is varied. The second set of test forms 6 is likewise printed with the printing process to be determined, and the color fields 7 are measured calorimetrically.

From the measured values, the printing color profile is finally calculated. The color profile is substantially a table with three dimensions on the input side that, for all the combinations of discrete, regularly spaced Lab color values, contains the associated printing color values. If the color profile according to FIG. 1 is used, it is then possible for all intermediate values to be obtained by interpolation between the tabular reference points. The compilation of the table requires that, for each position in the table, that is to say, for each reference point in the Lab color system, the corresponding N-tuple is entered for the associated N printing color values.

The test forms 6 from the second set of test forms are the images of three-dimensional grids in sub-spaces of the printing process color space. For practical reasons, they usually have a resolution between 5×5×5 and 11×11×11 grid points. The grid position of a point in this case determines its proportions of printing ink in the respective sub-space, and the coordinates of the point are the associated measured values in the Lab color system. By a suitable interpolation method, for example, with spline functions, grids with smaller spacings between the points are produced. A suitable grid has, for example, 32×3×32 points.

For each reference point to be processed in the Lab color system, that is to say, for each position in the table of the printing color profile to be determined, the Euclidean distances to all the grid points in all the highly interpolated test-form grids are calculated. The grid point with the smallest distance is selected. Because of the limited resolution of the test-form grids, it is expedient, in the environment of the grid point, to interpolate from its neighboring points a local, more finely resolved grid with a spacing of the grid points in the printing process sub-space of, for example, 0.5%. In the finer local grid, all the Euclidean distances to the Lab color value of the table reference point are again calculated, and the point with the smallest distance is selected.

For the point determined, an N-tuple is formed in which the three associated printing color values are plotted in the corresponding color sector, and the printing colors not belonging to the color sector are set to zero. The N-tuple is then entered into the position in the table just processed of the printing color profile. When the N-tuples have been entered for all the Lab reference points in the printing color profile, the method has been completed.

Until now, the simple case has been described, in which only the printing ink black is used on all points on the inner reference curve 1. Normally, however, in printing technology neutral colors are formed by overprinting black and some colored printing inks because, as a result, the neutral colors are reproduced darker and a smoother transition from neutral to colored colors is achieved. For such a case, the method according to the invention is modified appropriately, in that, for the colors on the inner reference curve 1, it is not just the printing ink black that is defined, but a combination of the standard printing inks CMYK. The relative proportions of these standard printing inks, with which they contribute to the build-up of the neutral colors, are expediently selected in a practical way, based on the experience with classical four-color printing, and leads to good results.

Figure 10:
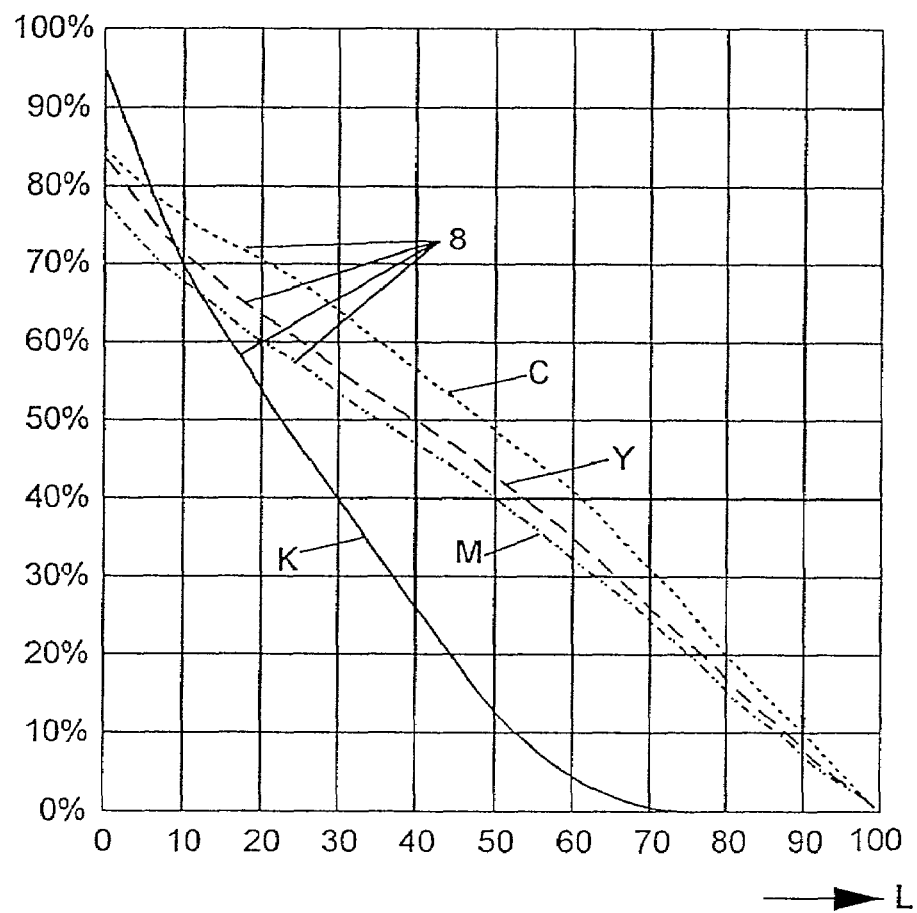
FIG. 10 is a graph showing a black composition with the printing inks CMYK according to the invention.

FIG. 10 shows an example of the relative proportions of CMYK in neutral colors, the proportions being plotted as functions 8 as a function of the lightness L. The composition is also designated by the specialist term "black composition". For the color white (L=100), all the proportions of CMYK are equal to zero. A gray value of L=50 is composed of the proportions C=48%, M=40%, Y=42%, K=12%. The color black (L=0), finally, has the proportions C=85%, M=78%, Y=84%, K=95%. It is also typical of such a black composition that light gray values do not contain any proportion of the printing ink black at all.

Figure 11:
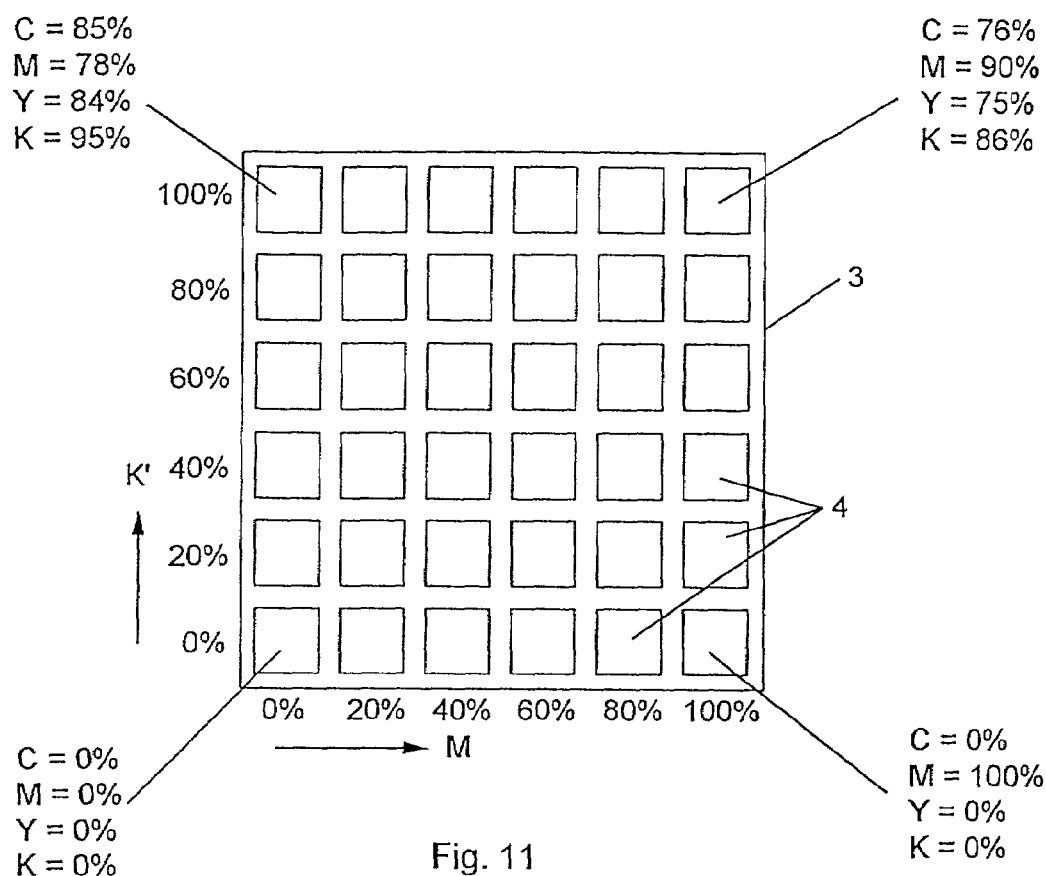
FIG. 11 is a diagrammatic representation of a test form, modified in accordance with the black composition for determining a boundary surface, according to the invention.
Figure 12:
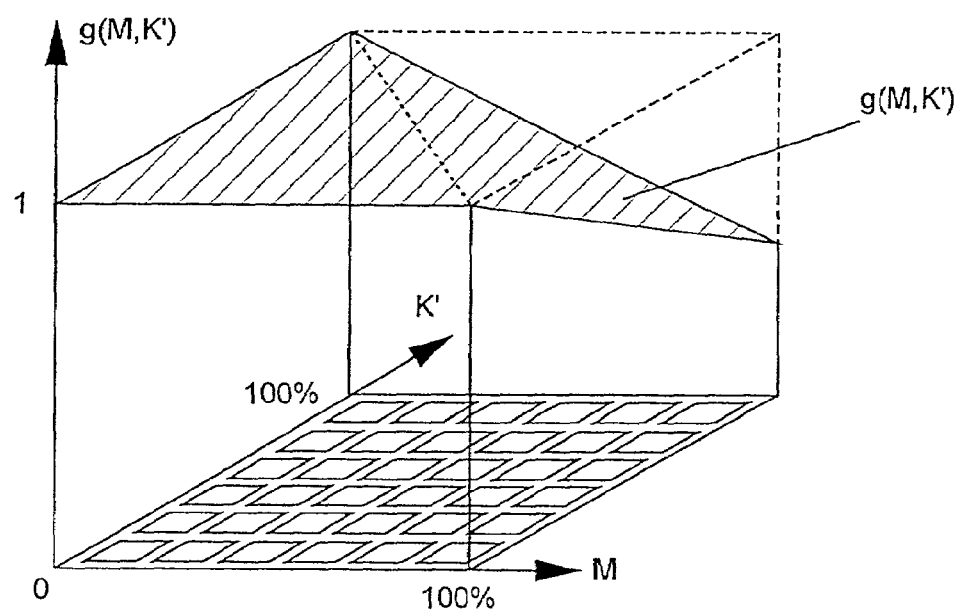
FIG. 12 is a three-dimensional graph showing a weighting function for the printing-ink proportions in a test form for determining a boundary surface according to the invention.

FIG. 11 shows a test form 3 modified for such a black composition to determine the boundary surface 2 for the color magenta. Instead of the printing ink K=black from FIG. 4, a formal printing ink K' as a combination of CMYK is varied in the vertical direction in the color fields 4. The composition of the color fields 4 in the first column in this case corresponds to the black composition according to the functions 8 in FIG. 10. This means that the bottom left color field has the composition C=0%, M=0%, Y=0%, K=0%, and the top left color field has the composition C=85%, M=78%, Y=84%, K=95%. In the bottom row, only the colored printing ink magenta is varied, that is to say the bottom right color field has the composition C=0%, M=100%, Y=0%, K=0%. In the other color fields 4, however, the proportions from the corresponding color fields from the left column and the bottom row are not simply superimposed because the result for the top right color field would then be too high an area coverage sum. To limit the area coverage sum for all the color fields of the test form to a sensible value, for example 340%, the proportions are weighted with a weighting function g(M, K') that falls toward the right and toward the top. Such a weighting function is illustrated qualitatively in FIG. 12. The precise course of the weighting function g(M, K') is not important, it merely needs to fall toward the top right corner of the test form 3. Without the weighting, the result for the top right color field would be the composition C=85%, M=100%, Y=84%, K=95%, with the area coverage sum of 364%. Using the weighting factor, for example, g(M, K')=0.9, the result for the top right color field is the composition C=76%, M=90%, Y=75%, K=86%, with the area coverage sum of 327%.

Instead of the conventional black composition on the inner reference curve 1, any other desired combination of some of the N printing inks can also be selected, for example, a black composition without the printing ink black and only with the printing inks cyan, magenta and yellow. In addition, for the method according to the invention, it is not necessary for the inner reference curve 1 formed by the selected printing ink combination to represent only neutral colors at all and to run close to the L axis of the Lab color system. An inner reference curve 1 can, for example, also be defined by the printing inks red, green, and magenta. It is important only that there is an inner reference curve 1 that is common to all the color sectors 5. However, it is advantageous if the selected printing ink combination results in an inner reference curve 1 that runs relatively far in the interior of the printing process color solid and not too close to the edge.

Even in the more general case, in which the colors on the inner reference curve 1 are formed by a combination of printing inks, a second set of test forms 6 is produced, a test form 6 being formed for each color sector 5, its color fields 7 containing combinations of the formal printing ink K' and the two colored printing inks F1 and F2 that define the boundary surfaces 2 of the color sector 5. Because the formal printing ink K', in turn, includes combinations of the printing inks selected for the inner reference line 1, there are actually, for example, six printing inks involved in the formation of a test form 6. Nevertheless, each color sector 5 respectively corresponds to a three-dimensional sub-space of the overall N-dimensional printing color space, and there is a unique association between the formal printing inks and the real ones.

The modified test form 6 again contains a number of groups of color fields 7 (cf. FIG. 9). In each group, the colored printing inks F1 and F2 are varied in steps, which define the boundary surfaces 2 of the color sector 5, and the formal printing ink K' has a constant printing color value. From group to group, the formal printing ink K' is varied. Because of the involvement of more than three real printing inks in the formation of the color fields 7, however, there is again the risk that the result in the top right corners of the groups, with a high K' proportion for the color fields 7, will be too high an area coverage sum. To limit the area coverage sum for all the color fields 7 of the test form 6 to a sensible value, for example 340%, the proportions are weighted in a manner analogous to FIG. 12, using a three-dimensional weighting function g(F1, F2, K'), which falls in a suitable way for the higher proportions of the printing inks F1 and F2 and, in particular, for the formal printing ink K'. The precise course of the weighting function g(F1, F2, K') is again unimportant. Following the printing and measurement of the modified test forms 6, the printing color profile in the form of the three-dimensional table is then determined as described above. During the interpolation of grids in the sub-spaces of the printing process color space, it is then only necessary to take care that the printing ink combinations in the color fields 7 of the modified test forms 6 do not have a uniform graduation, because of the application of the weighting function.

Figure 13:
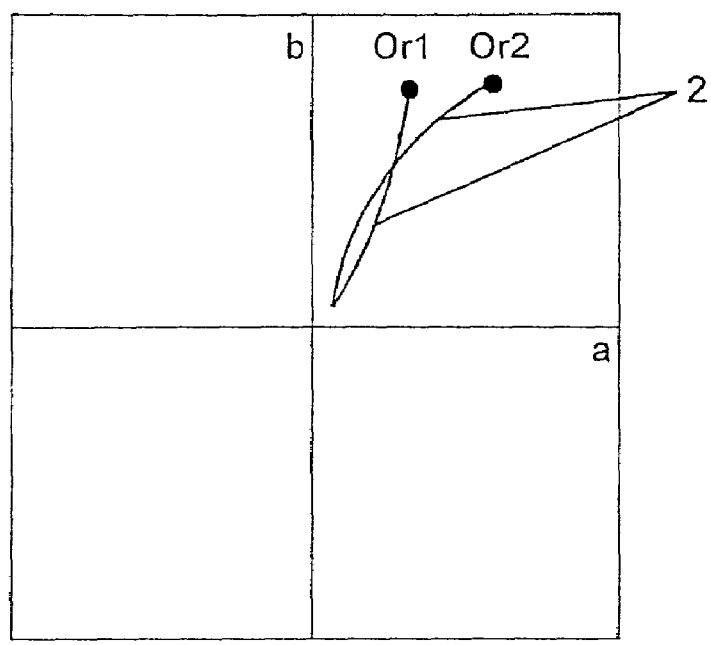
FIG. 13 is a plan view in the a,b plane of the graph of FIG. 5 showing an alternative embodiment of two orange printing inks in the Lab color system.
Figure 14:
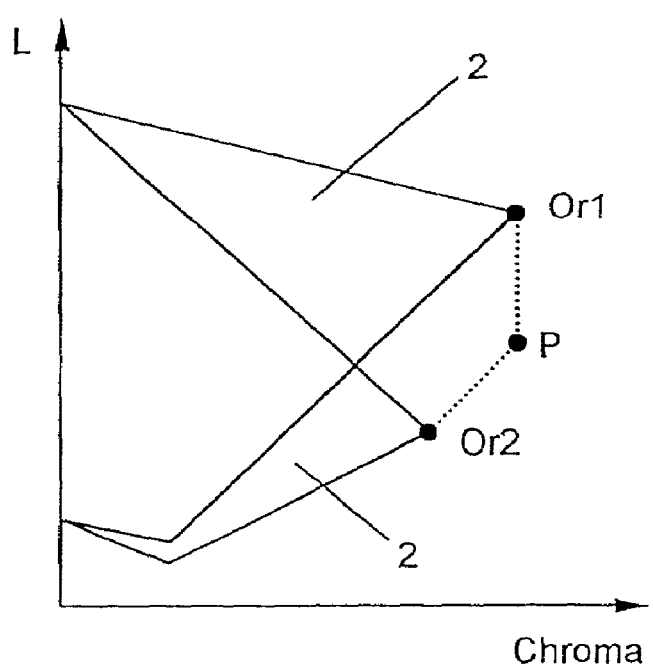
FIG. 14 is a graph of lightness and chroma of two orange printing inks in the Lab color system according to the invention.

The method according to the invention also permits the determination of suitable printing color profiles for the special case in which two colored printing inks have virtually the same hue angle. As an example of such a condition, FIG. 13 shows, in a view from above of the a,b plane, the boundary surfaces 2 of two different orange colors Or1 and Or2. The fact that it may be practical to print with two virtually identical printing inks is shown by FIG. 14, in which the boundary surfaces 2 of the two printing inks are represented in the coordinates lightness (L) and chroma (chroma is the distance from the L axis). In simplified form, here, the inner reference curve has been assumed to lie on the L axis. It becomes clear that the two boundary surfaces 2 overlap to a great extent, but, in each boundary area 2, there are also noticeable regions in which the respective other boundary surface 2 is not contained. This means that the color gamut that can be achieved is restricted if printing were carried out with only one of the two orange colors.

Figure 15:
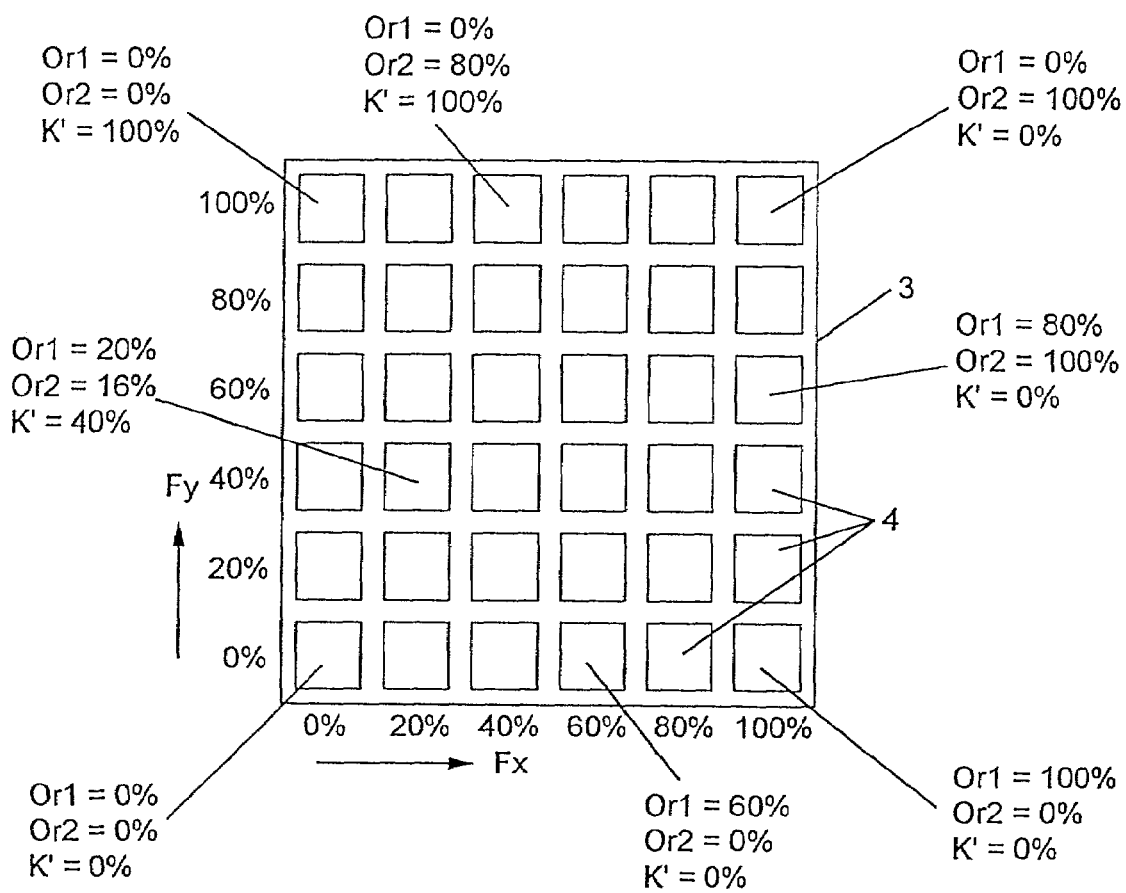
FIG. 15 is a diagrammatic representation of a modified test form for determining a boundary surface for two orange printing inks according to the invention.

The values for the combination of both full-tone colors can be taken from the last test form from the first set of test forms. The corresponding point is designated by P in FIG. 14. If the two orange printing inks and black (or a corresponding color combination for the colors on the inner reference curve) are combined, the entire color gamut of FIG. 14 can be covered with a new common boundary surface 2, which lies to some extent on the boundary surface for the printing ink Or1, to some extent on the boundary surface for the printing ink Or2 and to some extent between these two boundary surfaces. For such a purpose, a test form 3 is produced in accordance with the scheme from FIG. 4, in which the color fields 4 are composed of the three printing inks such that some color fields 4 contain only the printing ink Or1 in steps, other color fields 4 contain only the printing ink Or2 in steps, further color fields 4 contain only the black printing ink K' in steps, and the remaining color fields 4 contain various combinations of two or three of these colors. If the horizontal axis of the test form 3 is designated by Fx and the vertical axis by Fy, the following functions, for example, produce suitable proportions of the three printing inks Or1, Or2 and K' in the color fields 4:

$Or1 = \text{Min}(Fx, 2 \times (100-Fy))$ $Or2 = \text{Min}(Fx \times Fy/50, 100)$ $K' = \text{Min}(Fy, 2 \times (100-Fx))$ In FIG. 15, the combinations of the three printing inks that are produced in accordance with these functions are specified for some color fields 4. The functions for producing the test form 3 for this special case can be varied within wide limits. All that matters is that the color fields 4 produced completely cover the common color gamut of the printing colors Or1 and Or2 according to FIG. 14, and preferably with approximately equal-sized graduations.

Following the printing and measuring of the test form 3, the Lab color values determined define a common boundary surface 2 for the printing inks Or1 and Or2. During the production of the test form 6 for the two color sectors 5 that are bounded by the common boundary surface 2, the procedure is initially as though the test form were built up with the formal color Fx for one of the colors involved in the sector. For Fx, for example, the corresponding values for Or1 and Or2 are then used in accordance with the above functions.

To describe and illustrate the method according to the invention, the Lab color system has been used as the device-independent color system. The method is not restricted to such a color system but can be adapted to another device-independent color system, such as the CIEXYZ color system or the Luv color system.

I claim:

1. A method of determining a printing color profile for printing with N printing inks forming a color solid of printable colors in a device-independent color system, which comprises:

defining an inner reference curve in the device-independent color system by selecting one of the group consisting of a printing ink and a combination of printing inks;

defining boundary surfaces between the inner reference curve and an outer envelope of the color solid subdividing the color solid into color sectors by producing first test forms, the first test forms being printed and colorimetrically measured;

producing second test forms for the color sectors, the second test forms being printed and colorimetrically measured; and determining the printing color profile from measured values from the second test forms.

2. The method according to claim 1, which further comprises defining the inner reference curve by the printing ink black.

3. The method according to claim 1, which further comprises defining the inner reference curve by a combination of printing inks.

4. The method according to claim 1, wherein the inner reference curve lies in a region of neutral colors.

5. The method according to claim 2, wherein the inner reference curve lies in a region of neutral colors.

6. The method according to claim 3, wherein the inner reference curve lies in a region of neutral colors.

7. The method according to claim 1, wherein the first test forms contain color fields in which proportions of the printing inks selected for the inner reference curve and of one colored printing ink are varied.

8. The method according to claim 1, wherein the first test forms contain color fields, and which further comprises varying, in the color fields, proportions of the printing inks selected for the inner reference curve and of one colored printing ink.

9. The method according to claim 1, wherein:
the first test forms contain color fields in which proportions of the printing inks selected for the inner reference curve and of two colored printing inks are varied; and
a hue of the two colored printing inks are approximately equal.

10. The method according to claim 1, wherein:
the first test forms contain color fields in which proportions of the printing inks selected for the inner reference curve and of two colored printing inks are varied; and
a hue of the two colored printing inks are substantially equal.

11. The method according to claim 1, wherein the first test forms contain color fields, and which further comprises varying, in the color fields, proportions of the printing inks selected for the inner reference curve and of two colored printing inks, a hue of the two colored printing inks being approximately equal.

12. The method according to claim 1, wherein the first test forms contain color fields, and which further comprises varying, in the color fields, proportions of the printing inks selected for the inner reference curve and of two colored printing inks, a hue of the two colored printing inks being substantially equal.

13. The method according to claim 1, wherein the second test forms contain color fields in which proportions of the printing inks selected for the inner reference curve and of two colored printing inks are varied.

14. The method according to claim 1, wherein the second test forms contain color fields, and which further comprises varying, in the color fields, proportions of the printing inks selected for the inner reference curve and of two colored printing inks.

15. The method according to claim 1, wherein:
the second test forms contain color fields in which proportions of the printing inks selected for the inner reference curve and of three colored printing inks are varied; and
two of the three colored printing inks have an approximately identical hue.

16. The method according to claim 1, wherein:
the second test forms contain color fields in which proportions of the printing inks selected for the inner reference curve and of three colored printing inks are varied; and two of the three colored printing inks have a substantially identical hue.

17. The method according to claim 1, wherein the second test forms contain color fields, and which further comprises varying, in the color fields, proportions of the printing inks selected for the inner reference curve and of three colored printing inks, two of the three colored printing inks having an approximately identical hue.

18. The method according to claim 1, wherein the second test forms contain color fields, and which further comprises varying, in the color fields, proportions of the printing inks selected for the inner reference curve and of three colored printing inks, two of the three colored printing inks having a substantially identical hue.

19. The method according to claim 1, which further comprises:
describing the printing color profile in the form of a table; and
assigning, in the table, printing color values of the printing inks with which predefined colors can be printed to predefined device-independent color values.

20. The method according to claim 1, wherein the printing color profile is a table having predefined device-independent color values assigned to printing color values of the printing inks with which predefined colors can be printed.

21. A method of determining a printing color profile for printing with N printing inks forming a color solid of printable colors in a Lab color system, which comprises:
defining an inner reference curve in the Lab color system by selecting one of the group consisting of a printing ink and a combination of printing inks;
defining boundary surfaces between the inner reference curve and an outer envelope of the color solid subdividing the color solid into color sectors by producing first test forms, the first test forms being printed and colorimetrically measured;
producing second test forms for the color sectors, the second test forms being printed and colorimetrically measured; and
determining the printing color profile from measured values from the second test forms.

* * * * *